March 26, 1957  O. J. POUPITCH  2,786,249
SEALING MOLDING CLIP
Filed Sept. 11, 1952  2 Sheets-Sheet 1
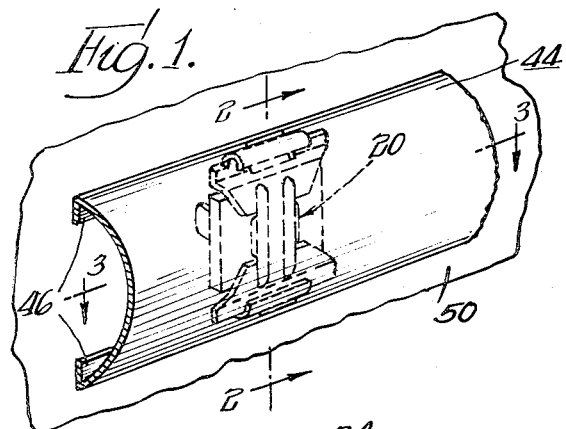
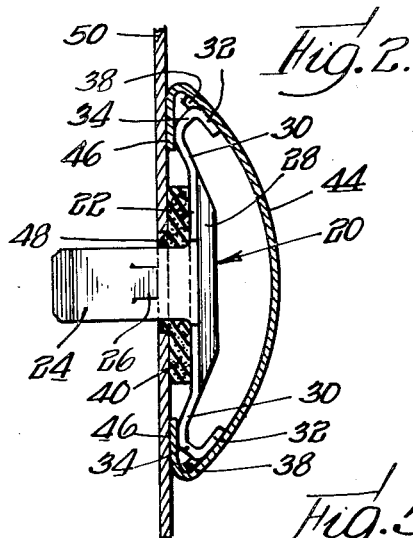
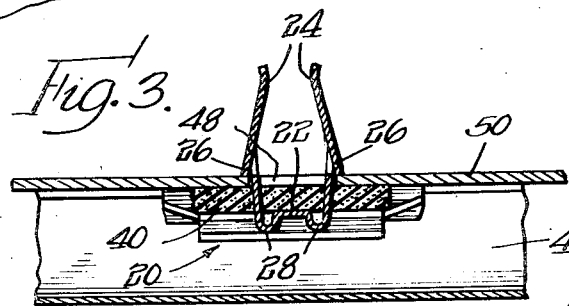
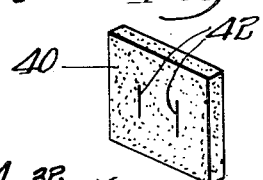
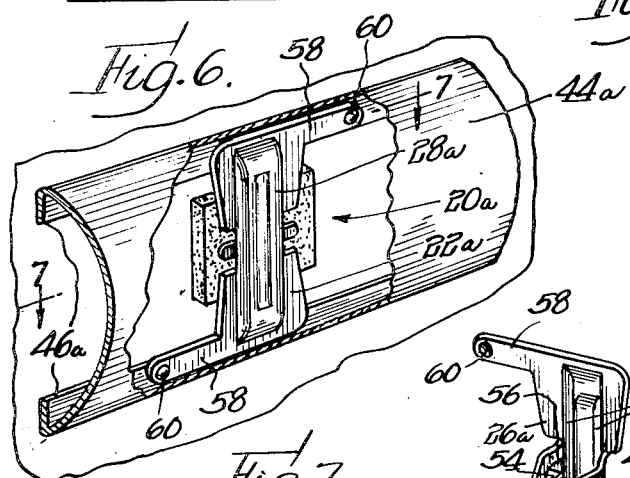
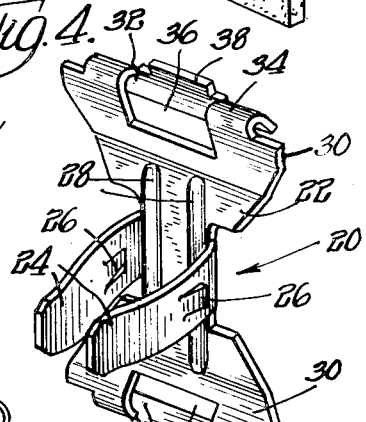
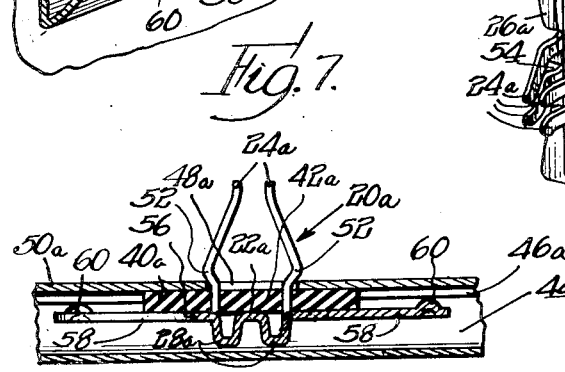
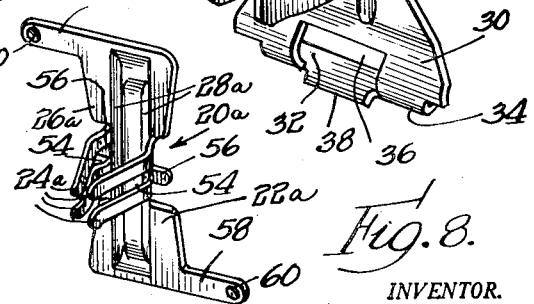
INVENTOR.
Ougljesa Jules Poupitch
By: Moore, Olson & Trexler
attys.

March 26, 1957 O. J. POUPITCH 2,786,249
SEALING MOLDING CLIP
Filed Sept. 11, 1952 2 Sheets-Sheet 2
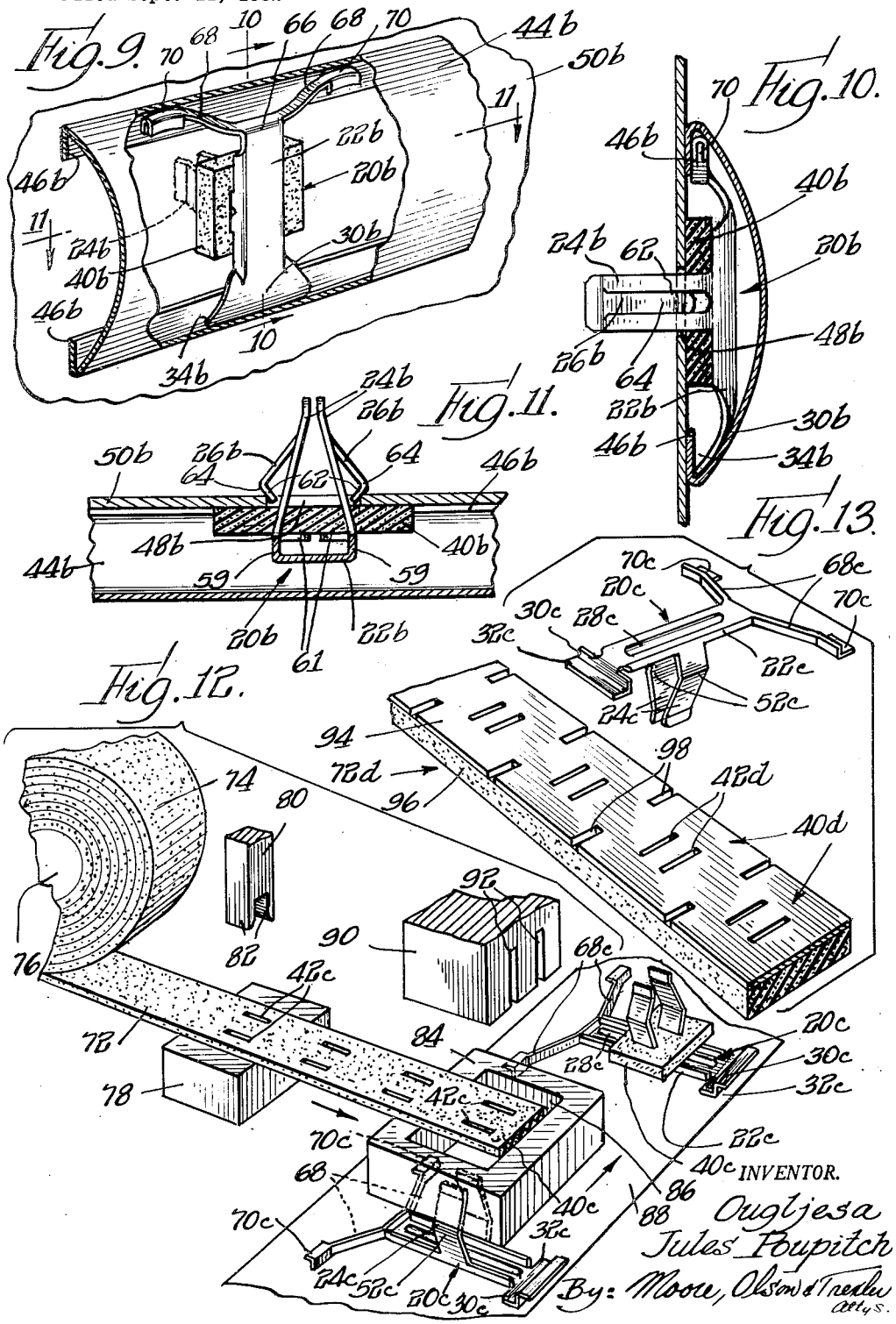

United States Patent Office 2,786,249
Patented Mar. 26, 1957

2,786,249

SEALING MOLDING CLIP

Ougljesa Jules Poupitch, Itasca, Ill., assignor to Illinois Tool Works, Chicago, Ill., a corporation of Illinois Application September 11, 1952, Serial No. 308,958

1 Claim. (Cl. 24—73)

This invention is concerned with a molding clip, particularly a snap-in molding clip which seals the hole into which the clip is snapped.

Snap-in clips for securing molding strips on automobiles and the like have long been in common use. They permit installation of a continuous, non-interrupted molding strip or the like with no fastener showing, and they readily and quickly can be installed from one side of an apertured work panel without the necessity of access to the other side of the panel or the formation of a threaded or otherwise complicated aperture. The apertures provided in panels for receipt of snap-in clips have permitted the passage of water and water vapor leading to rusting of the panel and parts behind the panel, have permitted the passage of cold air in the wintertime, and in some instances have allowed the transmission of an undesirable amount of sound.

It is accordingly an object of this invention to provide a snap-in molding clip which seals the aperture into which it is inserted.

Another object of this invention is to provide a molding clip carrying a deformable sealing member adapted to be compressed in and across an aperture upon insertion of the clip thereinto to seal the aperture.

A further object of this invention is to provide a snap-in molding clip having a rigidified sheet metal central portion with a deformable sealing member carried beneath the central portion.

Yet another object of this invention is to provide a molding clip adapted to be preassembled with a molding or the like and adapted to seal an aperture upon insertion therein.

This invention contemplates achieving the above named and other objects through the provision of a sheet metal molding clip having a body portion having a pair of resilient legs extending therefrom and carrying a deformable section of sponge rubber or the like. The clip is designed to be preassembled with a molding strip and the resilient legs are flexible independently of the body portion of the clip so that subsequent insertion of the legs into an aperture has no effect on the retention of the strip on the clip. The body portion is ribbed or otherwise shaped for rigidification and is substantially as large as the aperture so that the sponge rubber deformable member carried on the legs beneath the body may be compressed across and within the aperture. In addition to sealing the aperture, the rubber member or section serves as a sound absorbing medium and aids in holding parts tightly together so that they cannot rattle.

The enumerated and other objects and advantages of the invention, as well as the details thereof, will be apparent from the following description when taken in connection with the accompanying drawings wherein:

Fig. 1 is a perspective view of a preferred form of my molding clip in installed position in cooperation with a molding strip and a work panel;

Fig. 2 is a vertical sectional view taken along the line 2—2 of Fig. 1;

Fig. 3 is a horizontal sectional view taken along the line 3—3 of Fig. 1;

Fig. 4 is a perspective view of the clip;

Fig. 5 is a perspective view of the sponge rubber sealing member;

Fig. 6 is a perspective view similar to Fig. 1 and with certain parts broken away showing another embodiment of the invention;

Fig. 7 is a horizontal sectional view taken substantially along the line 7—7 in Fig. 6;

Fig. 8 is a perspective view of the clip shown in Figs. 6 and 7;

Fig. 9 is a perspective view similar to Figs. 1 and 6 with certain parts broken away;

Fig. 10 is a vertical sectional view taken along the line 10—10 of Fig. 9;

Fig. 11 is a horizontal sectional view taken along the line 11—11 of Fig. 9;

Fig. 12 illustrates the formation of the rubber sealing member and assembly thereof with a sheet metal molding clip modified slightly from that shown in Figs. 9–11; and Fig. 13 shows a molding clip about to be assembled with a different type of sealing member.

Referring first to Figs. 1–5, there may be seen a molding clip generally designated by the numeral 20. The molding clip 20 comprises a central body portion 22 having recessed edges from which a pair of spring legs 24 project. The legs diverge slightly outwardly of the body section and then converge toward one another and are provided with outwardly turned edges or lips. Substantially at and spaced slightly toward the body section the legs are provided with outwardly struck out tongues 26 adapted to engage a panel to retain the clip in installed position as will be apparent hereinafter.

The body section 22 is provided with a pair of ribs 28 running lengthwise of the body to strengthen and rigidify the body. The opposite ends of the body are provided with flanges 30 extending outwardly therefrom and directed slightly in the direction of the legs 24 to form in conjunction with the body a dished out structure to accommodate a sealing member as will be apparent shortly. The flanges 30 are folded back upon themselves at 32, the latter parts being of reduced width, to provide shoulder portions 34. The flanges 30 and shoulder portions 34 are provided with openings 36, and short tongues 38 extend outwardly from the reversely bent flange portions 32 past the shoulder portions 34 to aid in securing a molding strip more snugly as will be apparent shortly.

The molding clip 20 is completed by a rectangular sealing member 40 preferably formed of sponge rubber or other suitable deformable and relatively impervious material. The sealing member 40 is provided with a pair of parallel, spaced apart slits 42 which accommodate the clip legs 24 for positioning the sealing member 40 snugly against the under side of the body 22.

The clip 20 preferably is first assembled with an outwardly bowed, elongated molding strip 44 having inturned edge flanges 46 by camming the flanges 46 over the reversely bent flange portions 32 and behind the shoulders 34 into engagement with the flange portions 30. The legs 24 of the clip then are pushed through a square or rectangular aperture 48 in a work panel 50. The legs 24 are cammed toward one another as they are inserted through the aperture 48 and then spring apart to catch the tongues 26 behind the work panel 50 to lock the clip firmly in place.

The sponge rubber or other sealing member 40 is compressed by the body portion 22 tightly across the aperture 48 and is squeezed part way into the aperture to seal the aperture tightly. The dished out configuration or concavity formed by the body portion 22 and flanges 30 accommodates the sealing member 40 while allowing the shoulders 34 to clamp the flanges 46 tightly against the work panel 50 and thereby to secure the molding strip 44 tightly and free from rattles. The outwardly extending tongues 38 engage the inner surface of the outwardly bowed portion of the molding strip to aid in securing the strip against transverse movement.

A modification of the invention is shown in Figs. 6–8. In the modification of Figs. 6–8 parts similar to those heretofore described will be identified by similar numerals with the addition of the suffix *a*. The clip 20*a* is provided with a substantially flat body section 22*a* which is somewhat longer than the body 22 previously described. The body section 22*a* is provided with ribs 28*a* running substantially from end to end thereof for strengthening and rigidifying the body.

The body is provided with a narrow mid section from which project two pairs of legs 24*a*. The legs 24*a* are not provided with a struck out tongue similar to the tongue 26, but instead are provided with relatively sharp bends forming shoulders 52 adapted to engage behind a panel. Each pair of fingers 24*a* is spaced apart as at 54 and short projections 56 are left extending from the body 22*a* when the legs are struck from the plane of the body. The projections afford a broader base for more effectively compressing the sealing member across the aperture and extending part way thereinto.

The clip 20*a* is provided with a pair of arms 58 extending in parallelism to one another from opposite corners of the body portion and at right angles to the length of the body portion. Each of the arms near its outer end has a nub or detent 60 projecting from the plane of the arm.

The clip 20*a* is provided with a sealing member of sponge rubber or the like 40*a* which is provided with slits 42*a* to receive the legs 24*a*. Due to the configuration of the legs 24*a*, I find it more convenient to pass the legs of each pair through a different one of the slits, i. e. corresponding legs of each pair pass through a common slit.

The molding strip 44*a* is similar to that previously described and is provided with inwardly directed edge flanges 46*a*. The clip is preassembled with the molding strip by placing it within the strip with the body portion 22*a* and arms 58 arranged diagonally of the strip 44*a*. Subsequent rotation of the clip about the legs 24*a* brings the arms 58 and outer extremities of the body 22*a* into engagement with the inside surfaces of the flanges 46*a*, the protuberances 60 serving to lock the clip in position. The legs 24*a* then are inserted through an aperture 48*a* in a work panel 50*a* as set forth with regard to the earlier embodiment, the shoulders 52 snapping behind the work panel to hold the clip and molding strip firmly in place.

Another modification of the invention is shown in Figs. 9–11. In this modification the parts, insofar as they are similar to parts previously described, will be identified by similar numerals with the addition of the subscript *b*. The clip 20*b* is provided with an elongated body portion 22*b*. The body 22*b* has no strengthening rib, but instead is provided with longitudinal edge walls 59 having confronting longitudinal flanges 61. Two legs 24*b* extend outwardly from the edge walls 59 on the body and toward one another into nearly contacting relation at their outer ends. The legs 24*b* are provided with outwardly struck out tongues 26*b* having inturned tips 62 forming shoulder portions 64 for engaging against the back side of a work panel.

One end of the body section 22*b* is provided with a transversely elongated flange 30*b* which is directed angularly forwardly to provide a molding strip engaging edge or shoulder 34*b*. The opposite end of the body 22*b* is provided with a flange 66 angled slightly in the direction of the legs and carrying at its outer end a pair of outwardly diverging arms 68 which are provided at their outer ends with folded U-shaped portions 70.

The clip again is completed by a sponge rubber or the like sealing member 40*b* and the clip is preassembled with a molding strip 44*b* similar to that previously described by placing the U-shaped portions 70 behind one of the longitudinal flanges 46*b* of the strip and then flexing the arms to snap the edge 34*b* of the flange 30*b* behind the opposite molding strip flange 46*b*. The legs then are inserted through an aperture 48*b*, the tongues 26*b* flexing as they pass through the aperture and then springing outwardly so that the shoulders 64 engage behind the panel 50*b*.

A form of molding clip modified slightly from that shown in Figs. 9–11 is shown in Figs. 12 and 13 in which figures, assembly of the clip with the rubber sealing member is shown. The clip 20*c* in Figs. 12 and 13 comprises a flat body portion 22*c* having a single longitudinal stiffening rib 28*c*. The body is provided with a pair of legs 24*c* which first diverge and then converge to form shoulders 52*c* adapted to engage behind a work panel.

The body portion 22*c* is provided at one end with a down turned flange 30*c* having a right angularly disposed edge flange 32*c*. At the other end, the body portion 22*c* is provided with outwardly diverging arms 68*c* having right angularly disposed flanges 70*c* at the outer ends. The flanges 70*c* fit in a molding strip and the arms 68*c* flex to allow the flanges 32*c* to be seated in the molding strip as was the case with the flange 20*b*, as will be understood.

The rubber for the sealing members 40*c*, and similarly with the previously disclosed sealing members which are identical in construction, preferably is supplied from a strip 72 of sponge rubber or the like supplied in the form of a coil 74 which may be mounted on a core 76 if desired. The strip 72 is advanced intermittently from the roll 74 by any suitable or conventional means (not shown) across a fixed die block 78. A reciprocable die 80 having a pair of downwardly projecting, tapered prongs 82 is reciprocated in timed relation with the strip 72 by any suitable or conventional means (not shown) to punch the slits 42 for the sealing members in the strip 72. The strip 72 continues its intermittent advancement across a fixed shearing block or cut off die 84 of rectangular configuration and having a central rectangular opening 86.

Molding clips 20*c* are arranged transversely in predetermined spaced relation on a conveyor 88 of any suitable or conventional type which is advanced intermittently in timed relation with the strip 72 and the die 80 by any suitable or conventional means (not shown). A reciprocable die 90 of the same rectangular configuration and substantially the same size as the aperture 86 in the shearing block 84 is positioned above the aperture 86 and is arranged for reciprocation in timed relation with the movement of the strip 72 and the conveyor 88 by any suitable or conventional means (not shown). The reciprocable die 90 is provided in its lower face with a pair of deep transverse slots or grooves 92 adapted to receive at least the extremities of the molding clip legs 24*c*. As the reciprocable die 90 is reciprocated downwardly, it shears a sealing member 40*c* from the end of the strip 72 against the fixed shearing blocks 84. The die 90 carries the sealing member 40*c* down through the aperture 86 and on to the clip 20*c*, the legs 24*c* of the clip projecting through the slits 42*c* into the slots or grooves 92 of the die 90. After the die 90 moves upwardly, the conveyor 80 advances to bring another clip 20*c* into position beneath the shearing block 84 and the strip 72 is advanced into position above the shearing block 84. It will be understood that in each of the embodiments of the clip described in this disclosure the same apparatus and method of assembly may be used.

A slight modification is found in the sealing member in Fig. 13. In this modification, the strip 72*d* used for producing the sealing members 40*d* comprises a thin metal strip 94 which is bonded or otherwise permanently secured to a strip 96 of sponge rubber or other suitable deformable material. The strip 72*d* is provided with transverse slits 42*d* for receiving the legs of the molding clip while the metallic portion 94 of the strip is transversely notched as at 98 to facilitate breaking off of the strip 72d into individual sealing members 40d. The individual sealing members 40d may be broken or sheared from the strip 72d before assembly with the clips, as 20c, or the clips may be assembled with the strip, being alternately oriented in opposite directions as necessary to provide proper clearance. In the latter case the individual sealing members 40d with clips assembled therewith may be broken or sheared from the strip. The metal portion of the sealing member serves to compress the deformable portion more uniformly.

The various embodiments of the snap-in molding clip disclosed in this application all act in the same manner. The clips readily are snapped into an aperture in a work panel and lock in place without the necessity of access to the back side. The deformable sealing members on the clips effectively seal the apertures into which the clips are snapped against the passage of water and water vapor, cold air, and excessive noise. The inherent resilience of the sealing members causes the various parts to lock tightly together with substantially no possibility of rattling. The molding clip is formed of sheet metal and the central body section in each base is shaped from a plane to provide strength and rigidity. The snap-in legs of the clips all move independently of any other parts of the clips in snapping into position so that a molding strip can be preassembled with the clips with no danger of accidental disassembly as the clips are snapped into apertures in a work panel.

The specific examples shown and described will be understood as being for illustrative purposes only. The scope of the invention is limited only by the appended claim.

I claim:

A molding clip assembly adapted to be snapped into an aperture in a work panel to engage the inturned edges of a molding strip for securing the same on the panel and to seal the aperture; said molding clip assembly including a one-piece sheet metal clip comprising a relatively narrow elongated body having at opposite ends thereof transversely extending strip engaging attachment means offset slightly from the plane of the body toward the panel with which it is to be assembled, resilient leg means integral with the body and extending from the intermediate portion thereof substantially perpendicular to the plane of the body and away from the body in the direction of said attachment means, said resilient leg means having outwardly extending integral holding means for engaging the rear side of the panel and said holding means being spaced a relatively short predetermined distance from the body, said body including clamping portions of substantial extent between the transverse attaching means and the adjacent edges of the resilient leg means and said clamping portions being substantially symmetrically spaced the same predetermined distance from the said holding means whereby the entire body will be disposed close to the panel when assembled therewith; and said molding clip assembly further including a deformable pad through which the resilient leg means are passed with the holding means on each of the resilient leg means operating to trap the deformable pad against removal therefrom, the said deformable pad underlying substantially the entire extent of the body including the clamping portions between the leg means and the transverse attachment means so that the deformable pad is compressed by the body over a substantial area against the adjacent surface of the panel for sealing the aperture therethrough after assembly.

References Cited in the file of this patent

UNITED STATES PATENTS

| | | |
|---|---|---|
| 2,139,567 | Van Uum | Dec. 6, 1938 |
| 2,208,878 | Wiley | July 23, 1940 |
| 2,221,124 | Wiley | Nov. 12, 1940 |
| 2,227,290 | Wiley | Dec. 31, 1940 |
| 2,257,855 | Place | Oct. 7, 1941 |
| 2,287,606 | Eady | June 23, 1942 |
| 2,499,637 | Flora | Mar. 7, 1950 |
| 2,515,895 | Poupitch | July 18, 1950 |
| 2,521,354 | Flora | Sept. 5, 1950 |
| 2,677,862 | Flora | May 11, 1954 |